United States Patent
Torii

(10) Patent No.: US 8,085,771 B2
(45) Date of Patent: Dec. 27, 2011

(54) INFORMATION PROCESSING APPARATUS, IMAGE PROCESSING APPARATUS, CONTROL METHOD, AND STORAGE MEDIUM

(75) Inventor: Minoru Torii, Irvine, CA (US)

(73) Assignee: Canon Kabushiki Kaisha (JP)

( * ) Notice: Subject to any disclaimer, the term of this patent is extended or adjusted under 35 U.S.C. 154(b) by 252 days.

(21) Appl. No.: 12/489,734

(22) Filed: Jun. 23, 2009

(65) Prior Publication Data
US 2009/0323688 A1 Dec. 31, 2009

(30) Foreign Application Priority Data

Jun. 24, 2008 (JP) ................................. 2008-164699

(51) Int. Cl.
*H04L 12/28* (2006.01)
(52) U.S. Cl. ......... 370/390; 370/252; 370/392; 370/432
(58) Field of Classification Search ........................ None
See application file for complete search history.

(56) References Cited

U.S. PATENT DOCUMENTS

| | | | | |
|---|---|---|---|---|
| 7,450,580 | B2 * | 11/2008 | Itonaga et al. | 370/392 |
| 7,684,412 | B2 * | 3/2010 | Ohara | 370/395.54 |
| 2004/0100983 | A1 * | 5/2004 | Suzuki | 370/432 |

FOREIGN PATENT DOCUMENTS

JP 2000-196665 A 7/2000

* cited by examiner

*Primary Examiner* — Duc C Ho
(74) *Attorney, Agent, or Firm* — Rossi, Kimms & McDowell LLP

(57) ABSTRACT

An information processing apparatus which make it possible to search from an information processing apparatus, for an IPv6-compatible image processing apparatus which has an IPv6 network address designated by the information processing apparatus. A device management application determines search conditions, and specifies information associated with a designated network. Further, the device management application generates a IPv6 multicast address using the thus specified information, transmits a search message designating the IPv6 multicast address, and receives a response transmitted from an image processing apparatus associated with the IPv6 multicast address.

11 Claims, 20 Drawing Sheets

FIG. 10

PACKET EXAMPLE 1 | Src = IPv6 ADDRESS OF DEVICE MANAGEMENT APPLICATION
Dst=FF15:0:0:0:0:0:1:01d8

SNMP DATA

PACKET EXAMPLE 2 | Src = IPv6 ADDRESS OF DEVICE MANAGEMENT APPLICATION
Dst=FF15:0:0:0:1:0:0:100

SNMP DATA

PACKET EXAMPLE 3 | Src = IPv6 ADDRESS OF DEVICE MANAGEMENT APPLICATION
Dst=FF02::1

SNMP DATA

PACKET EXAMPLE 4 | Src = IPv6 ADDRESS OF DEVICE MANAGEMENT APPLICATION
Dst=FF02::1

ICMP DATA

FIG. 12

Step1: ☐☐☐

IPv6 MULTICAST SEARCH
―――――――――――――――――――

☑ SEARCH LINK LOCAL NETWORK BY IPv6
  MULTICAST SEARCH

☑ SEARCH DESIGNATED
  NETWORK BY IPv6 MULTICAST SEARCH

IPv6 PREFIX

| fd15:0:0:1 | | [ADD ENTRY] | Fd15:0:0:2 |
|---|---|---|---|
| | | [DELETE] | |

☑ SEARCH FOR STANDARD MIB DEVICES

HASH FUNCTION: 1201 — FUNCTION 1
               1202 — FUNCTION 2
               1203 — FUNCTION 3

FIG. 14

| | DEVICE LIST | | | | UPDATE DISPLAY |
|---|---|---|---|---|---|
| 1401 — FILTER | DEVICE NAME: | IPv6 ADDRESS: | Fd01:0:0:1 ▼<br>Fd01:0:0:2 | | APPLY |

DEVICE LIST

| SELECT ALL | CANCEL ALL | DELETE | | | UPDATE |
|---|---|---|---|---|---|

| | | DEVICE NAME | PRODUCT NAME | STATUS | LOCATION | IPv6 ADDRESS |
|---|---|---|---|---|---|---|
| ☑ | 🖨 | PRINTER A | iR C3200 | ○ NORMAL | 33 ONE'S ROOM | Fd01:0:0:1:12FF:0:FFE1:1234 |
| ☑ | 🖨 | MY PRINTER | iR C3170 | ○ ERROR | 32 ONE'S ROOM | Fd01:0:0:1:12FF:0:FFE1:1200 |
| ☐ | 🖨 | ABC PRINTER | LBP-5900 | ○ WARNING | 22 ONE'S ROOM | Fd01:0:0:1:12FF:0:FFE1:1235 |
| ☐ | 🖨 | XYZ PRINTER | LBP-5900 | ○ SERVICE CALL ERROR | 1F | Fd01:0:0:2:12FF:0:FFE1:123E |
| ☑ | 🖨 | PRINTER B | iR C3200 | ○ NORMAL | 1F | Fd01:0:0:2:12FF:0:FFE1:1222 |
| ☑ | 🖨 | EFT PRINTER | iR C3200 | ○ NORMAL | 25 ONE'S ROOM | Fd01:0:0:3:12FF:0:FFE1:12E0 |
| ☑ | 🖨 | MY COPY | iR C3170 | ○ NORMAL | CONFERENCE ROOM 3 | Fd01:0:0:3:12FF:0:FFE1:1233 |
| ☐ | 🖨 | AAA PRINTER | LBP-5900 | ○ NORMAL | OFFICE | Fd01:0:0:3:12FF:0:FFE1:1FFF |
| ☐ | 🖨 | BBB PRINTER | LBP-5900 | ○ ERROR | CONFERENCE ROOM 1 | Fd01:0:0:3:12FF:0:FFE1:1205 |

PRIOR ART
FIG. 20

2000 — IPv6 BROADCAST SEARC

2001 — ☑ SEARCH LOCAL NETWORK BY
IP BROADCAST

☑ SEARCH DESIGNATED NETWORK BY
IP BROADCAST

2002  IP BROADCAST ADDRESS

| 172.25.255.255 |  | ADD ENTRY | 172.24.255.255 |
| 172.26.255.255 |  | DELETE |  |

☑ SEARCH FOR STANDARD MIB DEVICES

IP ADDRESS DESIGNATED SEARCH

☑ SEARCH DESIGNATED IP ADDRESS

IP ADDRESS  172.24.1.1-172.24.1.100   ADD ENTRY

FILE OF SEARCH RANGE LIST
C:\home\ipaddr.csv   ADD ENTRY

IP ADDRESS TO BE SEARCHED 172.24.154.123
172.24.154.124

INFORMATION PROCESSING APPARATUS, IMAGE PROCESSING APPARATUS, CONTROL METHOD, AND STORAGE MEDIUM

BACKGROUND OF THE INVENTION

1. Field of the Invention

The present invention relates to an image processing apparatus searching for an image processing apparatus connected to a network, the image processing apparatus, a control method, and a storage medium.

2. Description of the Related Art

Conventionally, as a protocol for use in communication with a network device connected to the network (Internet), there has been used IPv4 (Internet Protocol version 4). IPv4 is a protocol located in a network layer defined in the OSI (Open System Interconnection) reference model, and uses 32-bit addresses, defining an address space in which it is used for addressing, routing, error control, etc.

Recently, a problem has occurred that in IPv4 representing the address space by 32 bits, the address space is running short due to an increase in devices connected to networks with the widespread use of the Internet. To solve this problem, IPv6 (Internet Protocol version 6) having an address space expanded to 128 bits has been developed and is being progressively introduced.

In IPv6, the 128-bit address format is composed of two parts: a network address portion formed of the most significant 64 bits and an interface ID formed of the least significant 64 bits. The most significant 64-bit portion is composed of a global routing prefix and a subnet ID.

Differences between three types of addresses, i.e. a stateful address, a stateless address, and a link local address, can be represented by differences between the network address. The stateful address is an IPv6 address acquired from a DHCP server using the DHCPv6 (Dynamic Host Configuration Protocol version 6) protocol. The stateless address is an IPv6 address automatically generated by an IPv6-compatible apparatus based on information sent from a router. The link local address is an IPv6 address that makes communication possible only within a network where the IPv6-compatible apparatus belongs (the same link). Each IPv6-compatible apparatus can have a plurality of addresses of the above-mentioned types bound thereto.

Further, when IPv6 is used, an IPv6-compatible apparatus communicates with a plurality of apparatuses by performing multicast in place of broadcast which has been conventionally performed when IPv4 is used. An IPv6 multicast address is composed of a format prefix (FP) formed by eight bits all set to 1 for indicating that the address is a multicast address, a flag formed by four bits for indicating whether the multicast address is one of multicast addresses permanently assigned by Internet Assigned Numbers Authority (IANA) (when set to 1) or a transient one (when set to 0), four bits indicating a scope indicative of a valid range of the address, and 112 bits indicating a group ID. Consequently, from the leading 4 bytes of an IPv6 address, the scope of an IPv6 multicast address can be known. For example, when the leading 4 bytes of an IPv6 address form FF01, it indicates a multicast address having a scope set to 1, i.e. an interface local scope. When the same form FF02, it indicates a multicast address having a scope set to 2, i.e. a link-local scope, and when the same define FF0E, it shows a multicast address having a scope set to E, i.e. a global scope. Some group IDs are reserved. For example, an SSDP protocol uses C. That is, multicast address set to a link-local scope for use with an SSDP protocol is FF02:0:0:0:0:0:0:C.

On the other hand, there has been proposed a technique concerning device search by a network device management apparatus using an SNMP (Simple Network Management Protocol) in an IPv4 network environment (see Japanese Patent Laid-Open Publication No. 2000-196665). According to Japanese Patent Laid-Open Publication No. 2000-196665, the network device management apparatus transmits broadcast packets to devices connected to a network, and forms a device list. By using subnet broadcast having a network address added to a broadcast address, it is possible to form device lists on a subnet-by-subnet basis.

The subnet broadcast is a broadcast request transmitted to devices that belong to a subnetwork. For example, let it be assumed that a network has a subnet mask of 255.255.255.0 and a network address of 192.168.32.0. In this network, a device transmits a packet to an address of 192.168.32.255 (i.e. a broadcast address) obtained by setting all the bits of the least significant 1 byte to 1. This causes the device to receive responses from all devices existing in the network.

Now, a brief description will be given of an example of the configuration of a network system comprised of a computer and a plurality of devices.

FIG. 19 is a schematic diagram showing an example of the configuration of a network system which is incapable of realizing broadcast by IPv6.

Referring to FIG. 19, the network system is comprised of a personal computer (hereinafter simply referred to as "the PC") 1901, a server 1902, and a plurality of devices 1903 to 1908. 1909 and 1910 represent routers. For devices within the local network 1911, device search by SNMP broadcast is carried out by an IT (Information Technology) administrator. Further, for devices within a designated network 1912 (beyond the routers), device search by SNMP subnet broadcast 1 and device search by SNMP subnet broadcast 2 are performed.

FIG. 20 is a view showing a device search configuration screen used for performing a device search by an SNMP protocol using IPv4.

Referring to FIG. 20, the device search configuration screen is displayed on a display section of the PC 1901. From the device search configuration screen, "SEARCH LOCAL NETWORK BY IP BROADCAST" 2000 and "SEARCH DESIGNATED NETWORK BY IP BROADCAST" 2001 can be selected as desired as a broadcast search. Further, an IP broadcast address 2002 can be designated.

In the technique disclosed in Japanese Patent Laid-Open Publication No. 2000-196665, however, it is assumed that the device search is performed by SNMP protocol using IPv4, but device search using IPv6 is not taken into consideration. As a consequence, the technique suffers from the problem that it is impossible to designate an IPv6 network address from the server 1902 to search for only IPv6 devices within the network. Further, it suffers from the problem that standard devices belonging to a local network where the server 1902 exists cannot be searched for from the server 1902.

SUMMARY OF THE INVENTION

The present invention provides an information processing apparatus, an image processing apparatus, a control method and a storage medium which make it possible to search from an information processing apparatus, for an IPv6-compatible image processing apparatus which has an IPv6 network address designated by the information processing apparatus.

In a first aspect of the present invention, there is provided an information processing apparatus that is capable of communicating, using IPv6, with a plurality of image processing apparatuses connected to a network, comprising a determination unit configured to determine whether or not search conditions for searching for image processing apparatuses are conditions for searching, by multicast, for image processing apparatuses belonging to a designated network, a specifying unit configured to specify information associated with the designated network, when the determination unit determines that the search conditions are conditions for searching, by multicast, for image processing apparatuses belonging to the designated network, a generation unit configured to generate a IPv6 multicast address using the information specified by the specifying unit, a transmission unit configured to transmit a search message designating the IPv6 multicast address generated by the generation unit, and a reception unit configured to receive a response transmitted from an image processing apparatus associated with the IPv6 multicast address.

In a second aspect of the present invention, there is provided an image processing apparatus that is capable of communicating, using IPv6, with an information processing apparatus connected to a network, comprising a reception unit configured to receive a search message designating a multicast address generated using a predetermined value which is calculated based on information associated with the network to which the image processing apparatus belongs, a generation unit configured to generate a multicast address using a value calculated with a same algorithm as an algorithm used in the calculation by the information processing apparatus, and a participation unit configured to cause the image processing apparatus to participate in a multicast group using the multicast address generated by the generation unit.

According to the present invention, a multicast address generated from the prefix of an IPv6 network address is used by the information processing apparatus and the image processing apparatuses. This makes it possible to search from the information processing apparatus, for IPv6-compatible image processing apparatuses each having the IPv6 network address designated by the information processing apparatus.

The features and advantages of the invention will become more apparent from the following detailed description taken in conjunction with the accompanying drawings.

BRIEF DESCRIPTION OF THE DRAWINGS

FIG. 10 is a view showing examples of packets that are sent back from the device to the device management application.

FIG. 12 is a view showing a hash function-selecting screen of the device management application.

FIG. 14 is a view showing a filter function of a device list screen of the device management application.

FIG. 20 is a view showing a device search configuration screen used for performing a device search by an SNMP protocol using IPv4.

DETAILED DESCRIPTION OF THE EMBODIMENTS

The present invention will now be described in detail below with reference to the accompanying drawings showing embodiments thereof.

Figure 1:
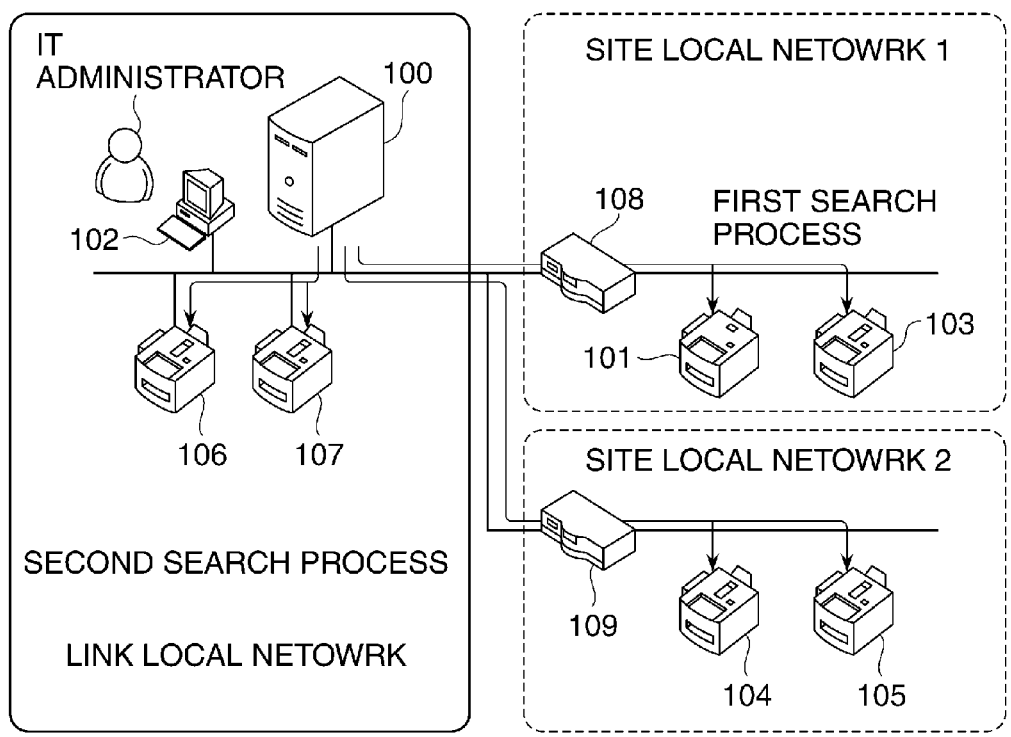
FIG. 1 is a schematic diagram showing an example of the configuration of a network device management system as a network system including an information processing apparatus according to a first embodiment of the present invention.

FIG. 1 is a schematic diagram showing an example of the configuration of a network device management system as a network system including an information processing apparatus according to a first embodiment of the present invention.

Referring to FIG. 1, the network device management system is comprised of a server 100, a PC 102, and devices 101, 103, 104, 105, 106 and 107. The server 100, the PC 102, and the devices 106 and 107 exist on a link local network. The devices 101 and 103, and a router 108 exist on a site local network 1. The devices 104 and 105, and a router 109 exist on a site local network 2. In the present embodiment, the local network means an internal network sectioned by a router. Further, in the present embodiment, the link local network is a local network where the PC 102 exists, and the site local networks are local networks where the PC 102 does not exist.

In the present embodiment, a description will be given of a configuration for causing a device management application program (hereinafter simply referred to as "the device management application") and a Web browser (hereinafter simply referred to as "the browser") to run on respective different devices, by way of example. More specifically, the server 100 (information processing apparatus) runs the device management application, whereas the PC 102 is operated by an IT administrator and the browser runs thereon.

The IT administrator can use the device management application running on the server 100 and the browser running on the PC 102 to thereby manage devices existing on the network, from a remote place. For example, the IT administrator can generate a task for searching for devices belonging to a certain network, using the PC 102, and display the results of execution of the task by the device management application, on the browser, as a list of the devices.

The device management application manages the devices on the network in response to requests from the browser operated by the IT administrator. Further, the device management application acquires device information (the IP address of each device, location information indicative of a place where the device is located, information indicative of the configuration of an optional device provided in the device, and so forth), described hereinafter, in response to a device information acquisition request from the browser. Further, the device management application sets appropriate values in response to a device configuration change request from the browser.

The device 101 (image processing apparatus) is configured as a multifunction peripheral which exists on the network and has a plurality of functions, such as an original reading function, a printing function and a communication function. The device 101 sends back device information or changes settings thereof, in response to a request from the device management application. The devices other than the device 101 are also configured as the multifunction peripherals or printers.

In the present embodiment, to search for the devices on the network using the device management application, it is possible to perform a first search process and a second search process, as shown in FIG. 1. The first search process searches for devices belonging to a designated site local network by IPv6 multicast. The second search process searches for devices belonging to the link local network on which the device management application (server 100) exists.

For example, in the first search process, the device management application searches for devices (the device 101 and the device 103) each having a designated IPv6 network address (belonging to a network having PrefixA). In the second search process, the device management application searches for standard devices (the device 106 and the device 107) belonging to the local network.

Figure 2:
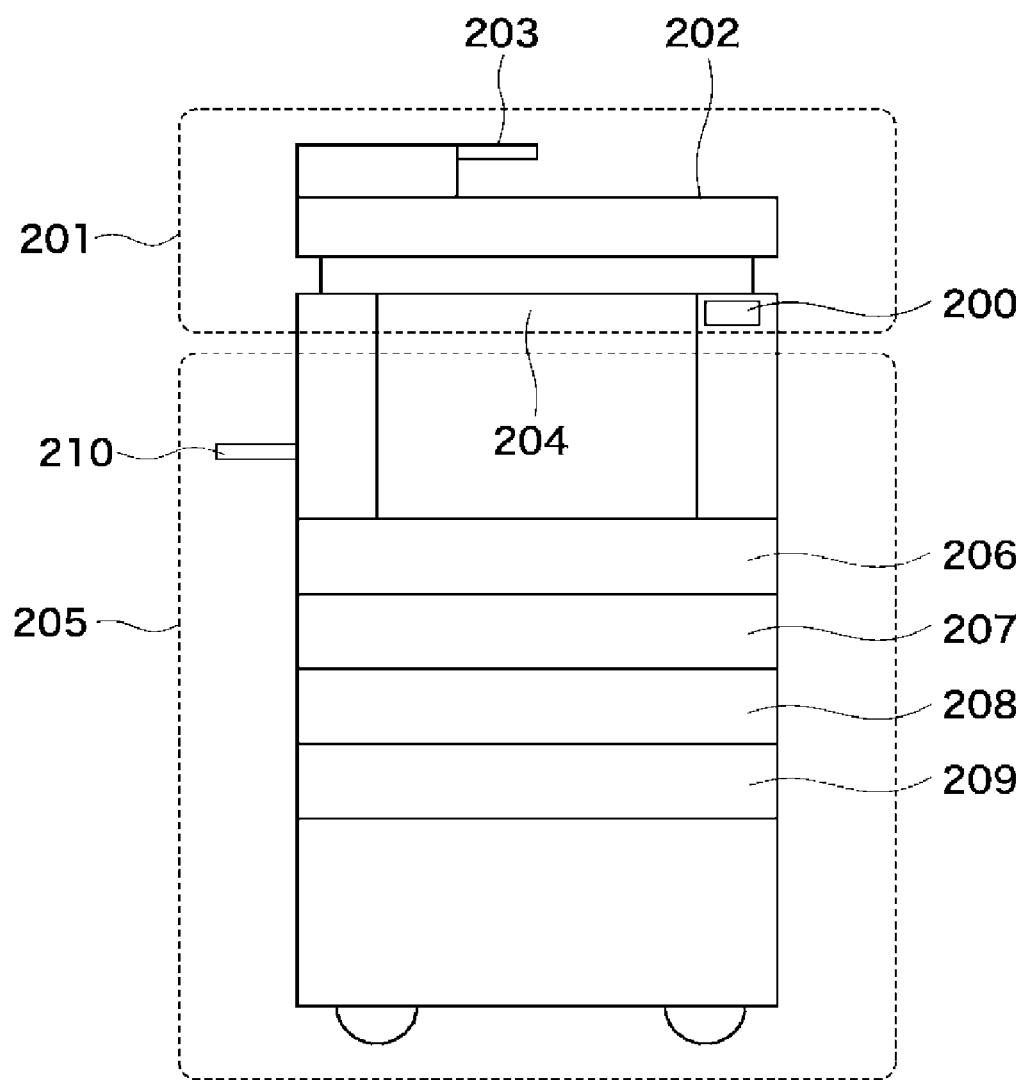
FIG. 2 is a schematic view of a device.

FIG. 2 is a schematic view of the device 101.

Referring to FIG. 2, the device 101 is comprised of a controller 200, a scanner section 201, an operating section 204 (panel), a printer section 205 and a storage section (not shown). Since the devices other than the device 101 are identical in configuration to the device 101 shown in FIG. 2, illustrations and descriptions thereof will be omitted.

Figure 9:
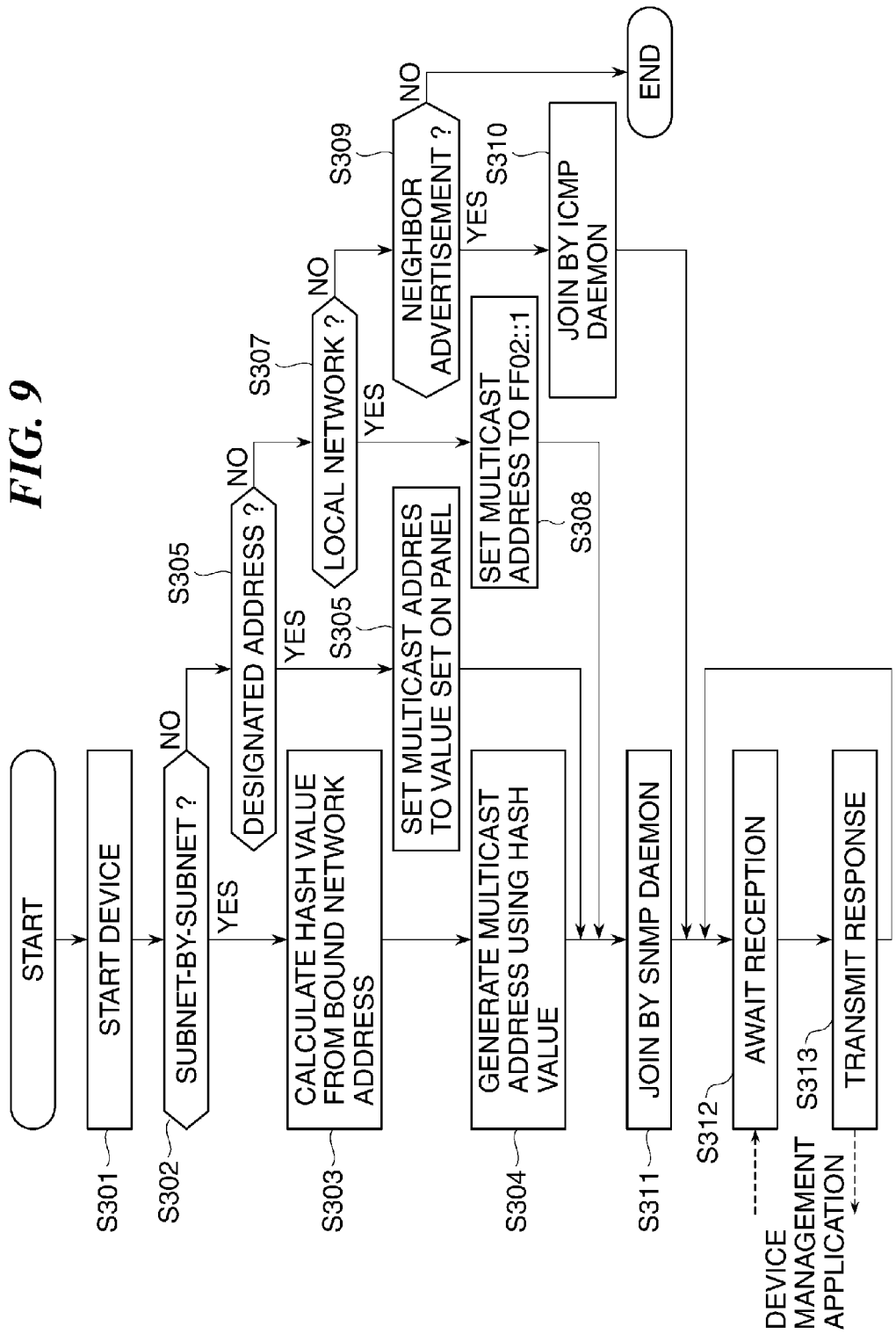
FIG. 9 is a flowchart showing operations of the device.
Figure 18:
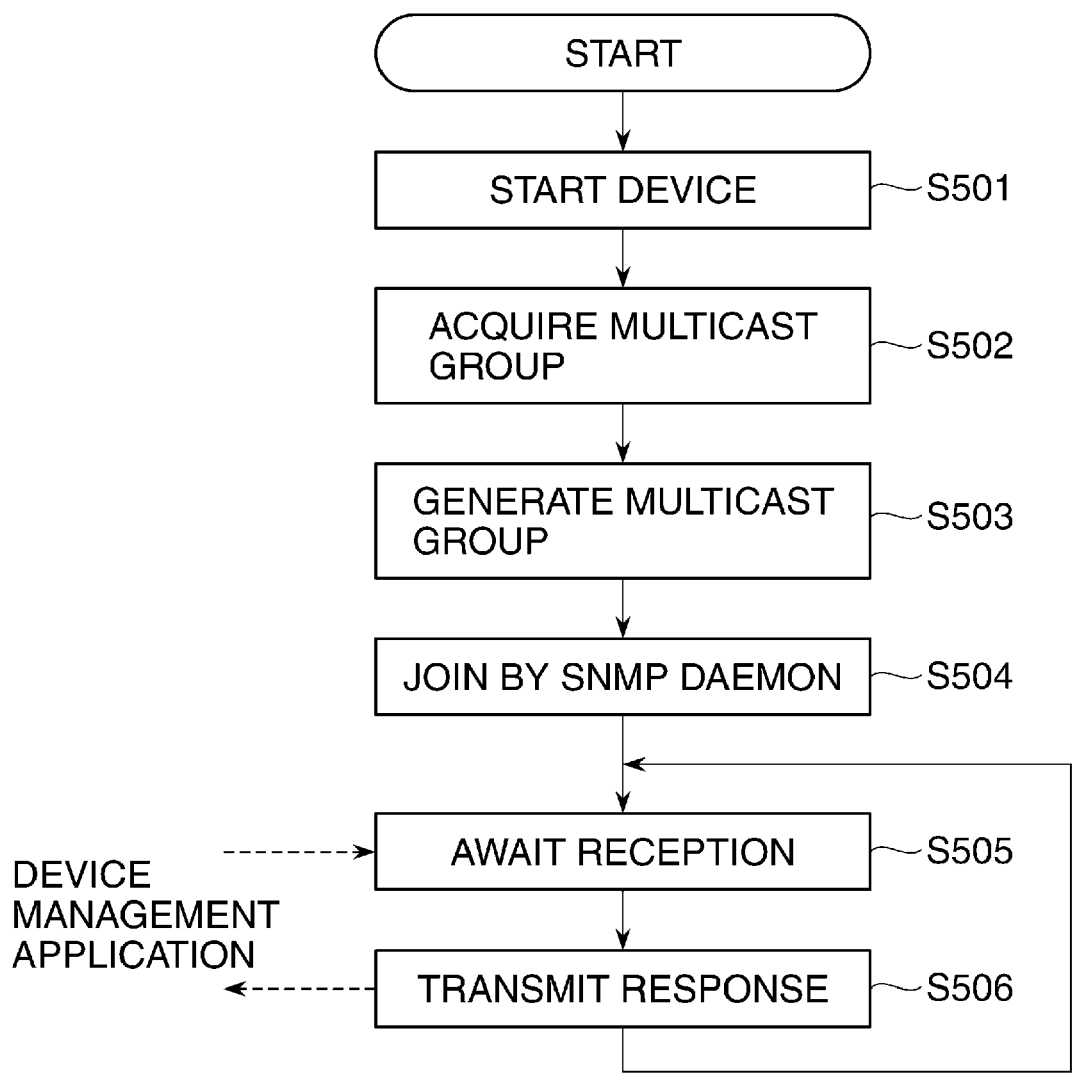
FIG. 18 is a flowchart showing operations of the device.
Figure 19:
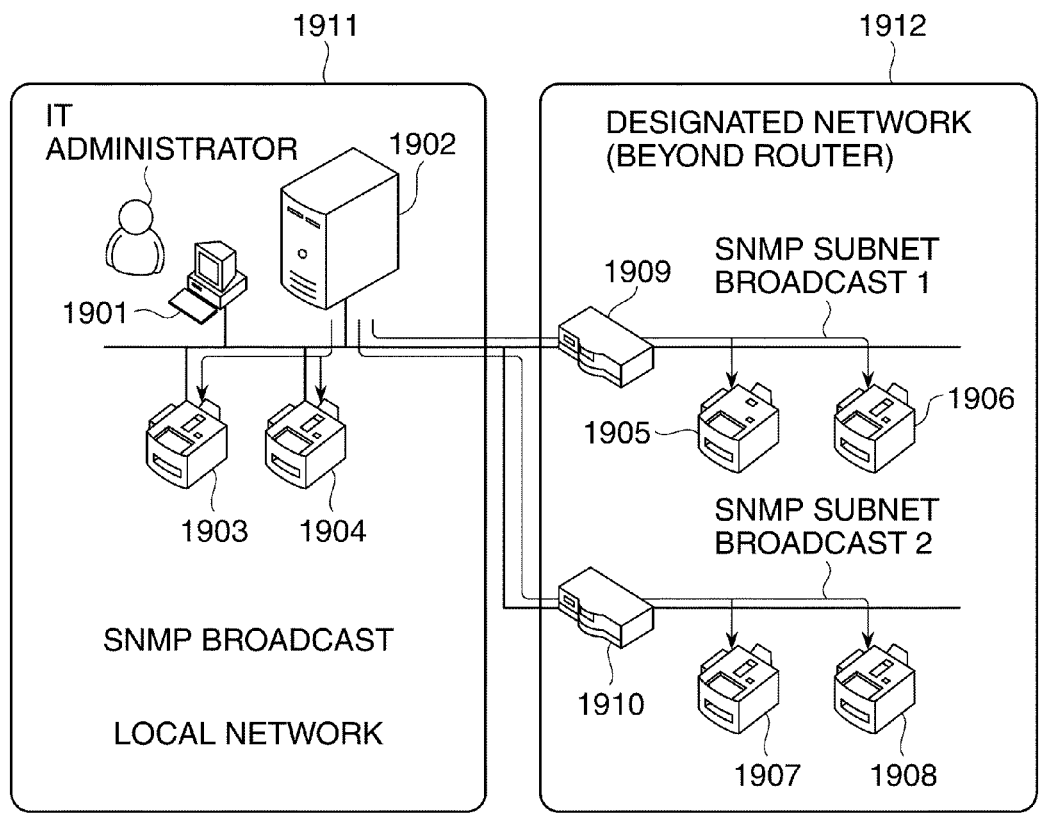
FIG. 19 is a schematic diagram showing an example of the configuration of a network system according to a conventional example, which is incapable of realizing broadcast using IPv6.

The controller 200 controls the overall operation of the device, and executes processes shown in respective flowcharts in FIG. 9 (first embodiment) and FIG. 18 (second embodiment) based on control programs stored in the storage section. The controller 200 is an example of a configuration for realizing a communication unit, a processing unit, a participation unit and a judgment unit of the image processing apparatus according to the present invention. The operating section 204 includes operating keys and a display screen (FIG. 3) via which the user configures various settings in the device 101 and gives instructions to the same. The operating section 204 is an example of a configuration for realizing a designation unit of the image processing apparatus according to the present invention.

The scanner section 201 is an image input section that reads an image from an original by illuminating the original and scanning the same using a CCD line sensor (not shown), and converts the image into an electric signal as raster image data.

The printer section 205 is an image output section that performs an image forming operation (printing operation) for converting electrical raster image data output from the scanner section 201 into a visible image on a sheet. Examples of the method for the conversion include an electrophotographic method which develops a latent image formed on a photosensitive drum or a photosensitive belt by a developer, for transferring an image developed from the latent image onto a sheet, an ink-jet method in which an image is directly printed on a sheet by jetting ink onto the sheet from an array of very small nozzles, but any suitable conversion method may be employed.

In performing copying by reading images from respective originals to form the images on respective sheets, the user instructs the start of an original reading operation for reading the originals set in a tray 203 of an original feeder 202, via the operating section 204, and in response thereto, the controller 200 gives the instruction for starting the reading operation to the scanner section 201. This causes the scanner section 201 to convey the originals one by one from the tray 203 to an original reading position by the original feeder 202, and perform an image reading operation using the CCD line sensor.

When the scanner section 201 has completed the reading of the originals, the controller 200 instructs the printer section 205 to start a printing operation. In response to this instruction, the printer section 205 feeds sheets from a corresponding one of a plurality of sheet cassettes 206, 207, 208 and 209 provided such that a desired sheet size or a desired sheet orientation can be selected therefrom, and performs the printing operation for forming the images on the sheets. Each sheet on which printing is completed is discharged into a discharge tray 210.

Figure 3:
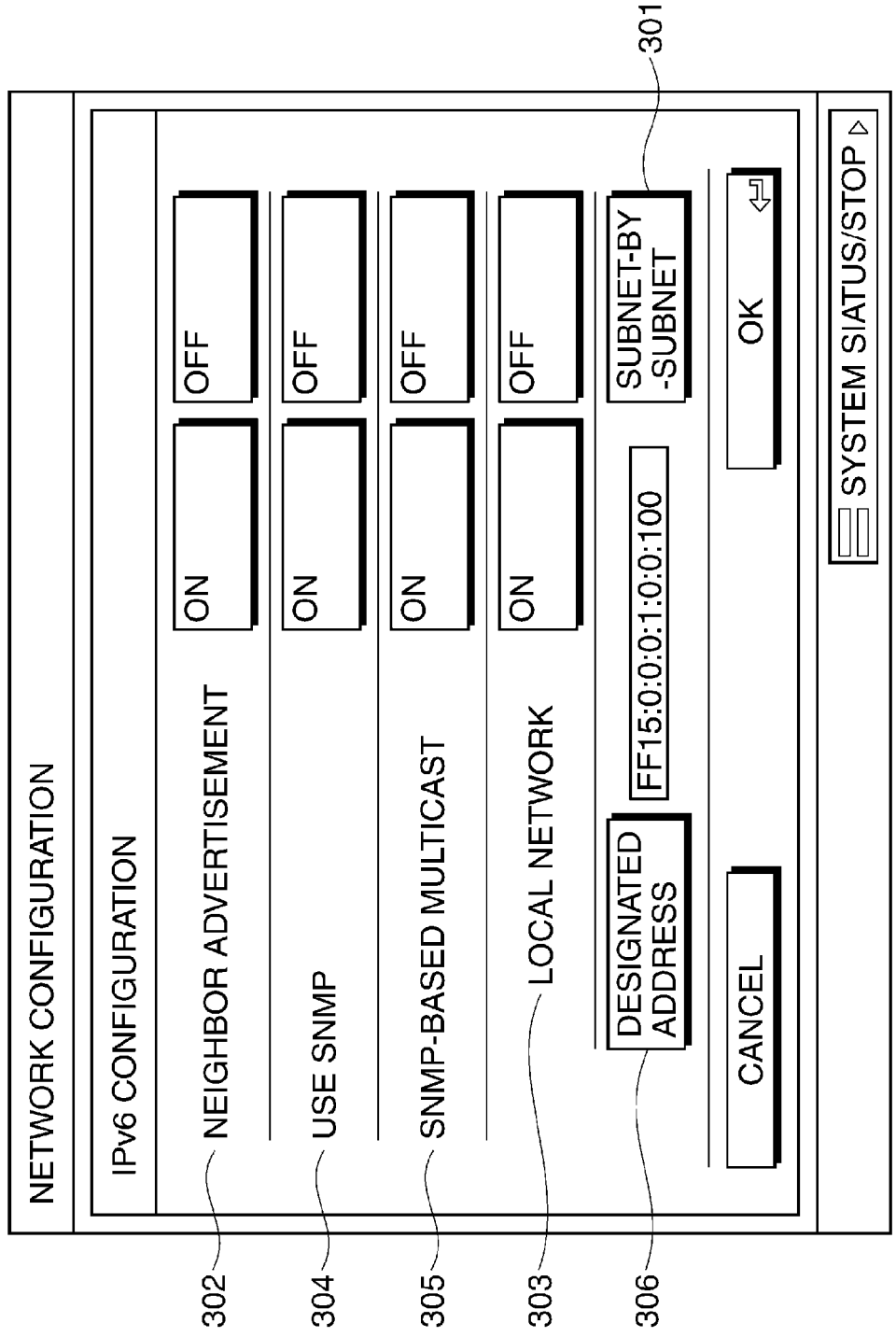
FIG. 3 is a view showing an example of a screen (IPv6 configuration screen) displayed on an operating section of the device.

FIG. 3 is a view showing an example of a screen (IPv6 configuration screen) displayed on the operating section 204 of the device 101.

Referring to FIG. 3, on the IPv6 configuration screen, if "SUBNET-BY-SUBNET" 301 is selected, it is possible to activate the first search process. Further, if "NEIGHBOR ADVERTISEMENT" 302 is set to ON, it is possible to activate the second search process. If "LOCAL NETWORK" 303 is set to ON, an SNMP daemon of the device 101 performs registration in a multicast address group of FF0X::1, and sends back a response to a request from the FF0X::1.

In the present embodiment, the SNMP protocol is used for device search, and hence it is necessary to set both "USE SNMP" 304 and "SNMP-BASED MULTICAST" 305 to ON. Further, it is also possible to select "DESIGNATED ADDRESS" 306 and designate a multicast address to be used by the SNMP daemon.

Figure 4:
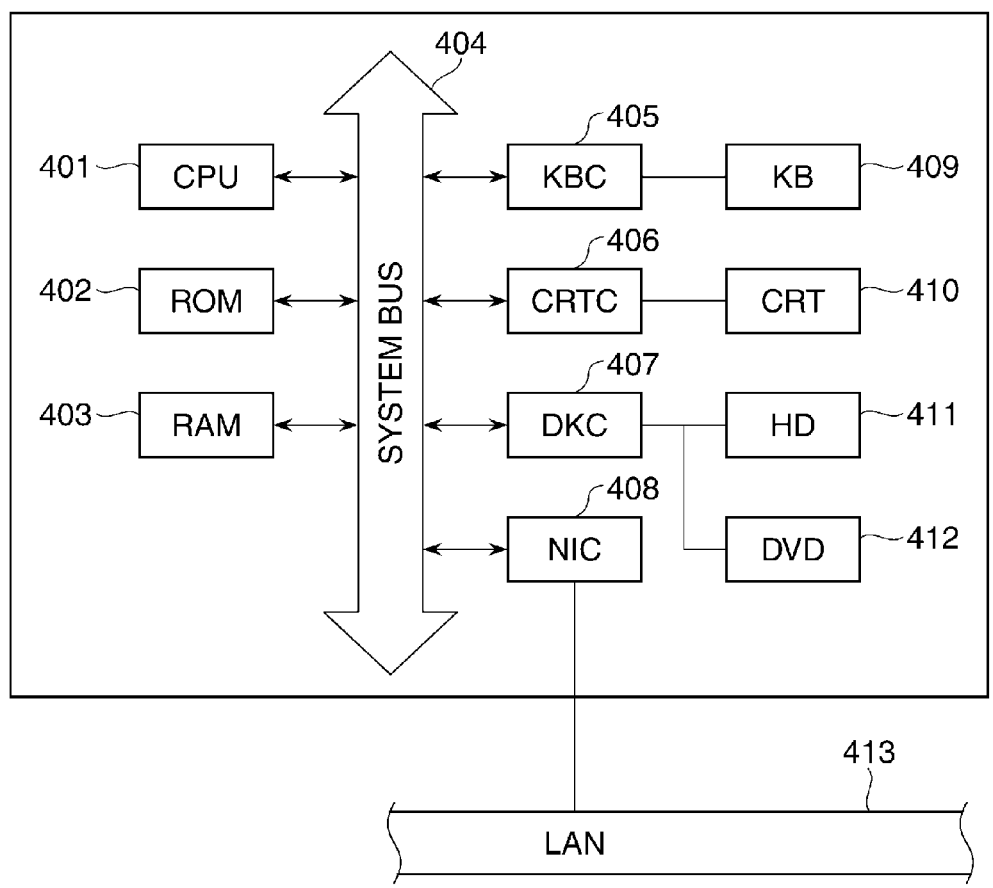
FIG. 4 is a block diagram showing the hardware configuration of a server on which a device management application runs.

FIG. 4 is a block diagram showing the hardware configuration of the server 100 on which a device management application runs.

Referring to FIG. 4, the server 100 is comprised of a CPU 401, a ROM 402, a RAM 403, a system bus 404, a keyboard controller (KBC) 405, a keyboard 409, a CRT controller (CRTC) 406 and a CRT display 410. Further, the server 100 includes a disk controller (DKC) 407, a hard disk (HD) drive 411, a DVD controller 412 and a network interface controller (NIC) 408.

The CPU 401 controls sections connected to the system bus 404, and executes various kinds of processing based on the device management application stored in a hard disk in the hard disk drive 411. The ROM 402 stores various programs and fixed data. The RAM 403 provides a work area and a temporary data storage area for the CPU 401. The keyboard controller 405 transmits data and instructions input from the keyboard 409 to the CPU 401.

The CRT controller 406 controls display on the CRT display 410. Although the CRT display is used as the display device, this is not limitative, but a liquid crystal display may be employed as the display device. The disk controller 407 controls writing and reading of various kinds of data into and out of the hard disk in the hard disk drive 411. The DVD controller 412 controls writing and reading of various kinds of data into and out of a DVD. The network interface controller 408 controls communication between the devices via the network including a LAN (Local Area Network) 413.

In the present embodiment, when the management of the network devices is performed by the server 100, the operation of the server 100 is predominantly executed by the CPU 401 as hardware, and the control of the same is mainly executed by the device management application stored in the hard disk. Although in the present embodiment, Windows (registered trademark) XP (available from Microsoft Corporation) is assumed as an OS (Operating System), by way of example, this is not limitative.

The device management application may be provided not only in a form stored in the hard disk but also in a form stored in a storage medium, such as a DVD or a CD-ROM. In this case, the device management application is read from the storage medium (the DVD or the CD-ROM) e.g. by the DVD controller 412 or a CD-ROM drive (not shown), and is installed in the hard disk of the hard disk drive 411.

Further, the PC 102 on which the browser runs is identical in configuration, though not shown, to the server 100 shown in FIG. 4, so that a description of the configuration of the PC 102 will be given with reference to FIG. 4, for convenience. The hard disk of the hard disk drive 411 has a program for the browser stored therein.

In the present embodiment, when the browser runs on the PC 102, the operation of the PC 102 is predominantly executed by the CPU 401 as hardware, and the control of the same is mainly executed by the browser stored in the hard disk. Although in the present embodiment, Windows (registered trademark) XP is assumed as the OS, by way of example, this is not limitative. In the case of Windows (registered trademark) XP, the browser is preinstalled during the installation of the OS.

Figure 5:
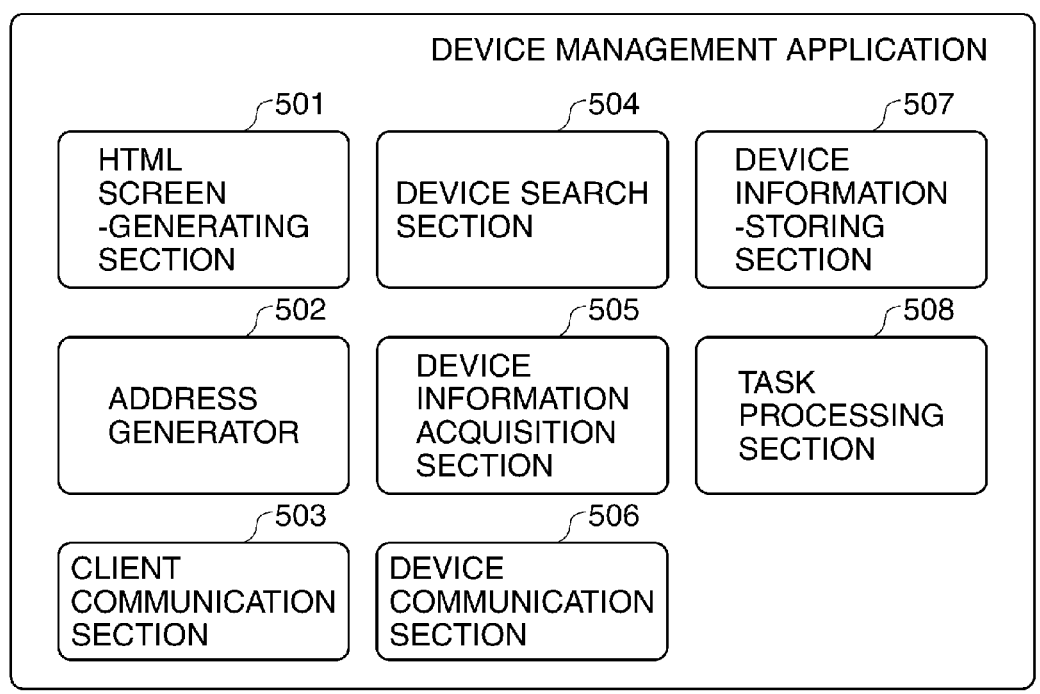
FIG. 5 is a block diagram showing the configuration of the device management application.

FIG. 5 is a block diagram showing the configuration of the device management application.

Referring to FIG. 5, the device management application is comprised of an HTML screen-generating section 501, an address generator 502, a client communication section 503, a device search section 504. Further, the device management application is comprised of a device information acquisition section 505, a device communication section 506, a device information-storing section 507 and a task processing section 508.

The configuration shown in FIG. 5 is an example of the configuration for realizing a determination unit, a calculation unit, a generation unit, a transmission unit, a reception unit, a selection unit, an acquisition unit and a display control unit of the information processing apparatus according to the present invention. The HTML screen-generating section 501 generates HTML (Hypertext Markup Language) data output to the browser. The address generator 502 generates an IPv6 multicast address used to transmit a multicast packet from the PC 102 to the devices.

In the first search process, the address generator 502 creates a multicast group using a hash function, and generates the IPv6 multicast address using the multicast group. That is, when search conditions for searching for the devices include search of the site local network, a hash value is generated from a prefix, which is an IPv6 network address, to generate the IPv6 multicast address for transmission.

The client communication section 503 transmits and receives the HTML screen to and from the browser. The device search section 504 searches for the devices on the network, and stores information on the devices found by the search in a database (not shown). The device search section 504 executes the sequence of the first search process and the second search process, to search for the devices based on search conditions. The device information acquisition section 505 acquires device information (the IP addresses of the devices, location information indicative of locations where the devices are arranged, information indicative of the configurations of optional devices attached to the devices, and so forth) from the devices, using the SNMP protocol.

The device communication section 506 communicates with (transmits packets to and receives responses from) the devices, using protocols e.g. of SNMP/SLP/Web service. The device information-storing section 507 stores the information acquired from the devices in the database. The task processing section 508 executes processing, such as device search, at a time designated by the IT administrator, in units called tasks. That is, the task processing section 508 executes search as a task.

Next, the operation of the network device management system configured as above according to the present embodiment will be described in details with reference to FIGS. 6 to 18.

Figure 6:
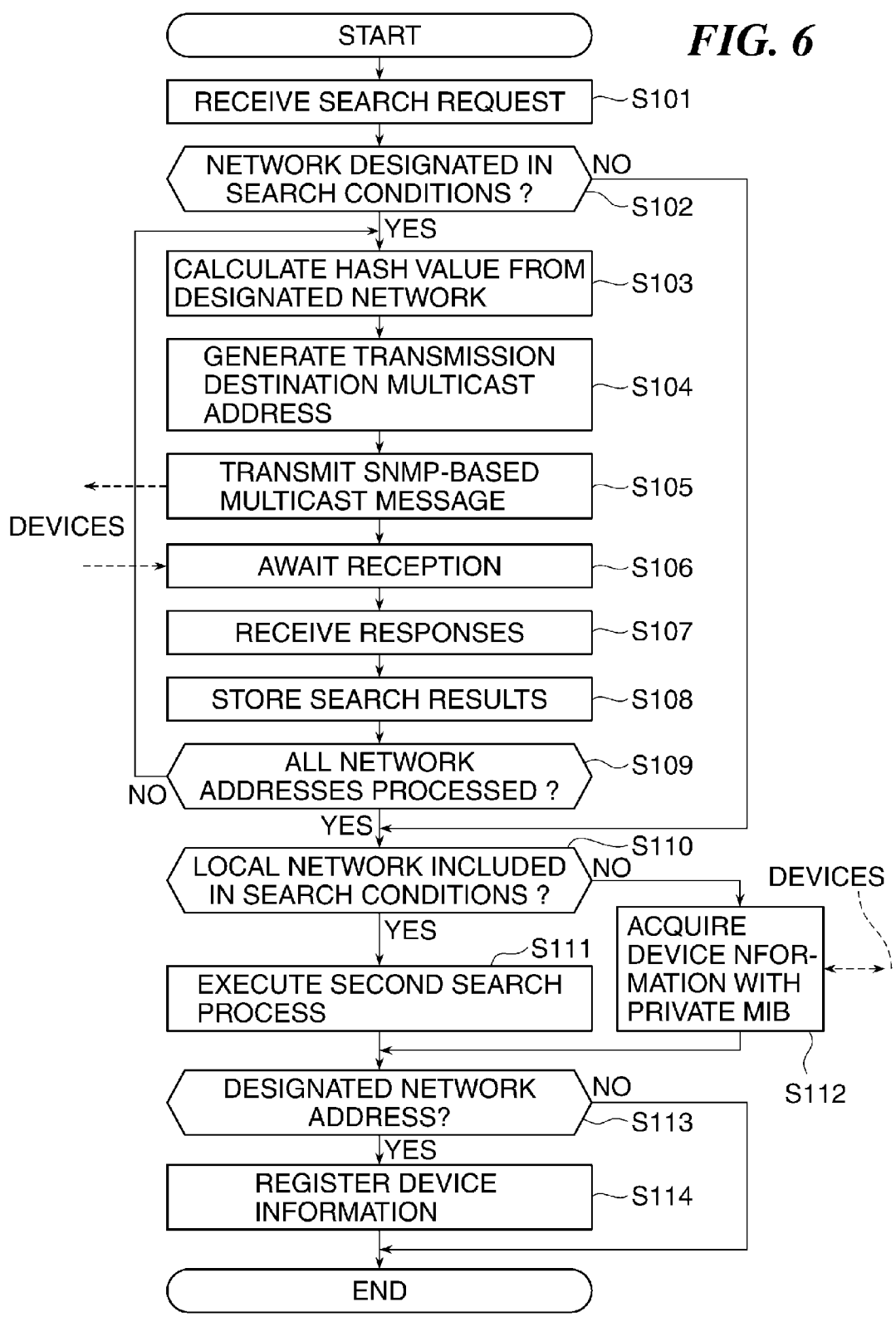
FIG. 6 is a flowchart of a first search process executed when a device search is performed by the device management application.

FIG. 6 is a flowchart of a first search process executed when a device search is performed by the device management application.

Figure 7:
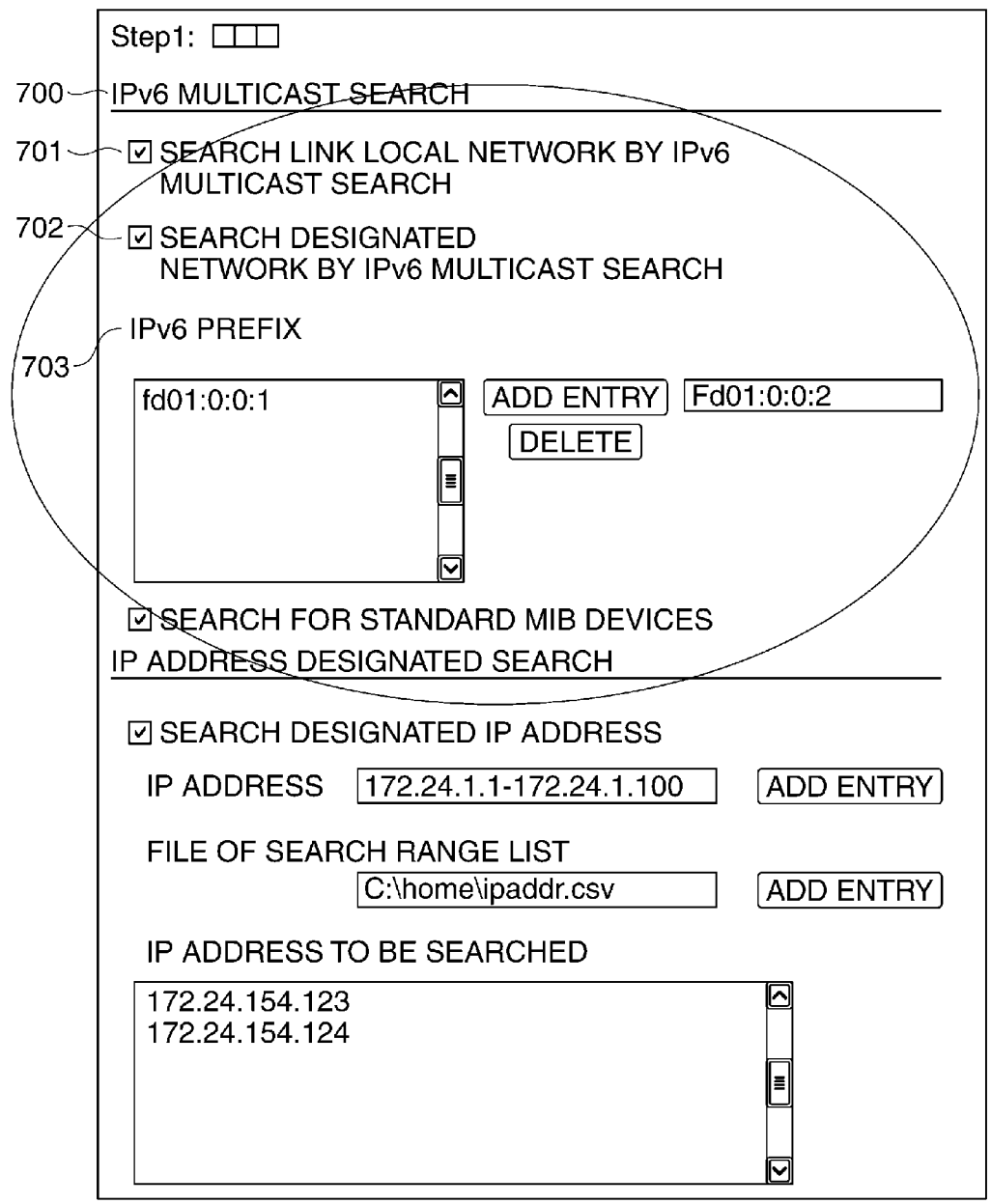
FIG. 7 is a view showing an example of a screen (IPv6 device search configuration screen of the device management application).

Referring to FIG. 6, in a step S101, the device management application of the server 100 receives a device search request from the browser of the PC 102 according to settings by the user from the IPv6 device search configuration screen shown in FIG. 7. Here, the FIG. 7 screen shows search conditions concerning IPv6. From the FIG. 7 screen, "SEARCH LINK LOCAL NETWORK BY IPv6 MULTICAST SEARCH" 701 and "SEARCH DESIGNATED NETWORK BY IPv6 MULTICAST SEARCH" 702 can be selected as desired as IPv6 multicast search 700. The IPv6 multicast search indicated by 701 corresponds to the second search process, and the IPv6 multicast search indicated by 702 corresponds to the first search process.

In a step S102, the device management application determines whether or not search conditions set by the user on the IPv6 device search configuration screen are for searching for devices belonging to a designated network by the IPv6 multicast (the first search process). If the search conditions set by the user are for searching for devices belonging to a designated network by the IPv6 multicast, the process proceeds to a step S103. If the search conditions set by the user are not for searching for devices belonging to a designated network by the IPv6 multicast, the process proceeds to a step S110.

In the step S103, the device management application calculates a value representative of a multicast group, from a prefix, which is a designated IPv6 network address, using a hash function (hash value; predetermined value). On the FIG. 7 IPv6 device search configuration screen, it is possible to set an IPv6 prefix 703.

In a step S104, the device management application generates a multicast address for transmission, using the hash value (the value representative of the multicast group) calculated in the step S103. The multicast address is calculated using the following equations:

Multicast address=$FF1X$+Base address+Hash function (prefix)

Example: $FF1X+::1:0000+Hash(FD00:0:AC18:9800)$
$=FF15:0:0:0:0:0:1:01d8$

In this equation, X=5 indicates a site local, and 1 in FF1X indicates that the address is not well-known (i.e. is not assigned by IANA (Internet Assigned Numbers Authority)). A portion "::1:0000" is a base address. An algorithm for the hash function is the same algorithm as used in the device 101.

In a step S105, the device management application generates a SNMP-based multicast packet using the generated multicast address. Further, the device management application transmits the SNMP-based multicast packet to devices belonging to the above-mentioned designated network. In a step S106, the device management application awaits reception of responses from the devices.

In a step S107, the device management application receives responses from the devices. Response packets have the same prefix as the prefix indicating the IPv6 network address, and are transmitted only from devices registered in the multicast group with the same hash function as the above-mentioned hash function. That is, it is possible to search for only devices having the designated network address (prefix). In a step S108, the device management application stores the results of the search for the device.

In a step S109, the device management application determines whether or not all the network addresses included in the search conditions have been processed. If not all the network addresses included in the search conditions have been processed, the process returns to the step S103. If all the network addresses included in the search conditions have been processed, the process proceeds to the step S110.

In the step S110, the device management application determines whether or not the search of the site local network is included in the search conditions. If the search of the site local network is included in the search conditions, the process proceeds to a step S111. In the step S111, the device management application executes the second search process. If the search of the site local network is not included in the search conditions, the process proceeds to a step S112. In the step S112, the device management application acquires device information from the devices using a private MIB (Management Information Base) in addition to the search results stored in the step S108.

In a step S113, the device management application confirms whether or not the address information of each device is included in the addresses designated as the search conditions. Although normally, the address of a device the device information of which can be registered is only an address having a designated prefix, even if prefixes different from each other are used, there is a possibility, though slight, that hash values generated from the prefixes become equal to each other due to the characteristics of the hash function. To exclude devices found by a search executed under such conditions, the prefix of the address of each device found by the search is confirmed as a precaution, by executing the step S113.

If the devices of which the device information is acquired each have an address having the designated prefix, the process proceeds to a step S114, wherein the device management application registers the device information in the database, followed by terminating the present process. If the devices of which the device information is acquired each have an address without the designated prefix, the device management application discards the device information (the device information of the devices having an address with an undesignated prefix), followed by terminating the present process.

Figure 8:
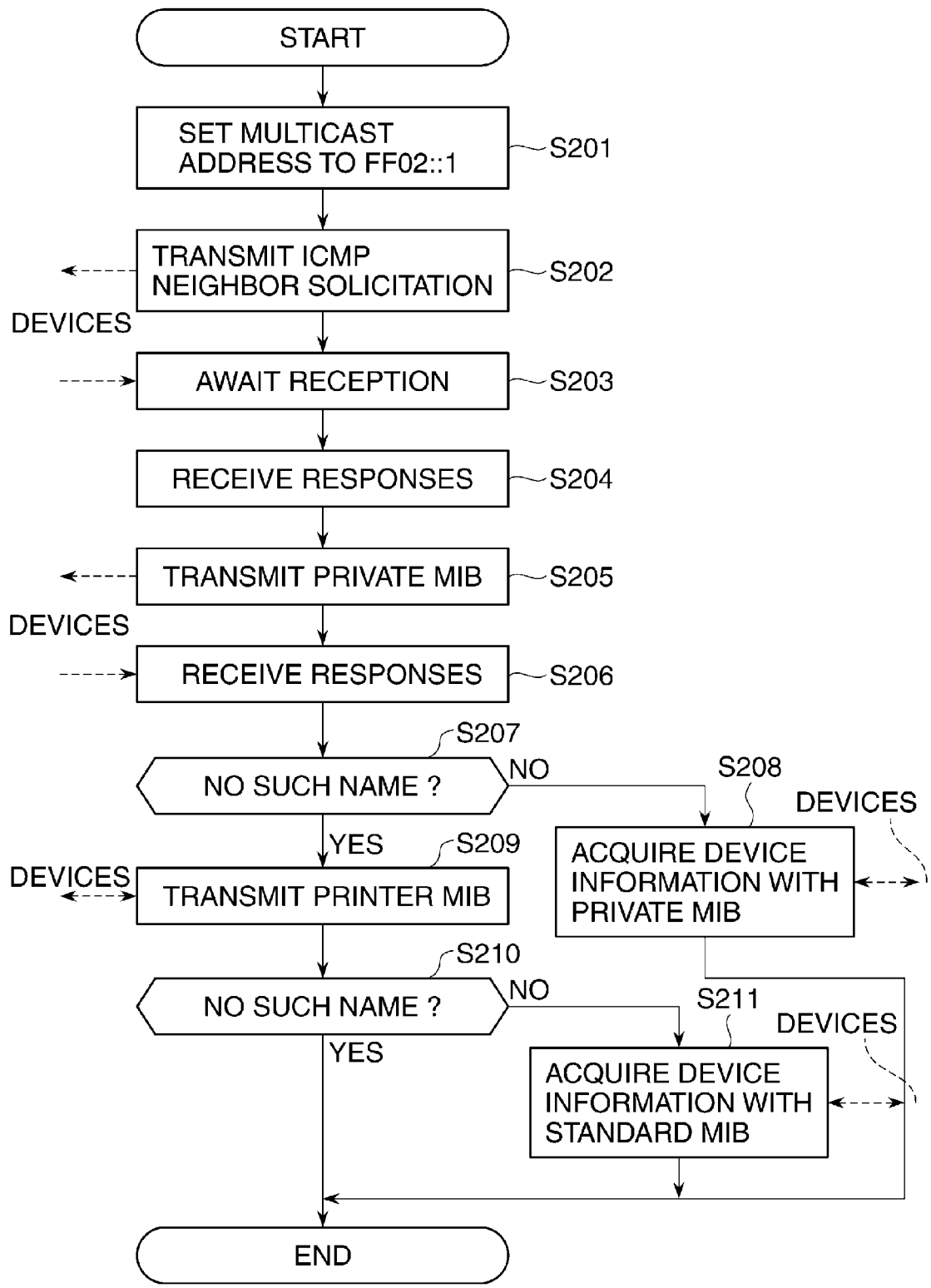
FIG. 8 is a flowchart of a second search process executed when a device search is performed by the device management application.

FIG. 8 is a flowchart of the second search process executed when the device search is performed by the device management application.

Referring to FIG. 8, in a step S201, the device management application of the server 100 sets the multicast address to FF02::1. In a step S202, the device management application transmits a neighbor solicitation having ICMP type 133 in the second search process for searching for devices belonging to the link local network on which the device management application (server 100) exists. ICMP indicates an abbreviation of an Internet Control Message Protocol. In a step S203, the device management application awaits reception of a response from any device (one of the devices 106 and 107) in the present embodiment.

In a step S204, the device management application receives the responses from the devices. At this time point, it is possible to receive the addresses of all the devices connected to the link local network. The term "all the devices" here is intended to mean all the devices, such as the multifunction peripheral, the printer and the router, which have the IPv6 addresses. In a step S205, the device management application sends the private MIB to the address of each device from which the response has been received in the step S204.

In a step S206, the device management application receives a response from each device (a neighbor advertisement sent back in response to the neighbor solicitation). In a step S207, the device management application determines whether or not the received response is a NoSuchName response. If the received response is not a NoSuchName response, the device management application judges that the device from which the response has been received is a device belonging to the local network, and in a step S208, the device management application additionally acquires device information from the device, using the private MIB. If the received response is a NoSuchName response, in a step S209, the device management application sends a printer MIB to all the addresses of NoSuchName.

In a step S210, the device management application determines whether or not a response to the printer MIB is a NoSuchName response. A device which has sent back NoSuchName as the response to the printer MIB is considered to have no printing function, and at the same time not within a range of devices to be managed, the device management application terminates the present process. A device which has sent back any value as the response to the printer MIB without sending back NoSuchName is considered to be a device having no printing function, and to continue the processing, the present process proceeds to a step S211, wherein the device management application acquires device information from the device using a standard MIB, followed by terminating the present process.

FIG. 9 is a flowchart showing operations of the device 101.

Referring to FIG. 9, in a step S301, the controller 200 of the device 101 starts the device 101 along with the turn-on of the power of the device 101 by the user. In a step S302, the controller 200 checks settings of the device 101 and determines whether or not the device 101 is configured such that it listens to (receives) an SNMP-based multicast message multicast on a subnet-by-subnet basis ("SUBNET-BY-SUBNET" 302 in FIG. 3 is selected).

It is determined in the step S302 that the device 101 is configured to listen to (receive) an SNMP-based multicast message multicast on a subnet-by-subnet basis, the process proceeds to a step S303, wherein the controller 200 calculates a hash value from a bound IPv6 network address (prefix) in the SNMP daemon. An algorithm used for calculating the above hash value is the same as used in the device management application. In a step S304, the controller 200 generates a multicast address using the hash value calculated in the step S303.

In a step S311, the controller 200 participates in the multicast group using the SNMP daemon. That is, the controller 200 participates in an SNMP-based multicast group using the multicast address generated in the step S304. This enables the device 101 to respond as a member of the multicast group intended by the device management application. In short, the device 101 becomes a device which is searched for (which sends back a response) in the first search process carried out by the device management application.

In the device 101, it is possible to set via the operating section 204 whether or not to generate a multicast address by calculating the hash value with the same algorithm as used in the device management application.

FIG. 10 shows examples of packets that are sent back from the device 101 to the device management application. Packet Example 1 shown in FIG. 10 illustrates a packet sent back to the device management application when the device 101 listens to an SNMP-based multicast message after the present process proceeds through the step S303, the step S304 and the step S311. The multicast address generated in the step S104 in FIG. 6 by the device management application is designated as the source address of the packet.

If it is determined in the step S302 that the device 101 is not configured to listen to (receive) an SNMP-based multicast message multicast on a subnet-by-subnet basis, the process proceeds to a step S305, wherein the controller 200 determines whether or not to listen to an SNMP-based multicast message multicast to a designated network address ("DESIGNATED ADDRESS" 306 in FIG. 3 is selected). If it is determined in the step S305 that the device 101 is not configured to listen to an SNMP-based multicast message multicast to a designated network address, the process proceeds to a step S306, wherein the controller 200 uses a multicast address set by the user through the operating section 204 (panel) of the device 101. Then, the process proceeds to the step S311, wherein the controller 200 joins the multicast group defined by the set multicast address using the SNMP daemon.

Packet Example 2 shown in FIG. 10 illustrates a packet sent back to the device management application when the device 101 listens to an SNMP-based multicast message after the present process proceeds through the step S305, the step S306 and the step S311. The multicast address used in the step S306 is one set on the IPv6 configuration screen of the operating section 204 appearing in FIG. 3.

If it is determined in the step S305 that the device 101 is not configured to listen to an SNMP-based multicast message multicast to a designated network address, the process proceeds to a step S307, wherein the controller 200 determines whether or not to respond to an SNMP-based multicast message multicast to a local network ("LOCAL NETWORK" 303 in FIG. 3 is selected). If it is determined in the step S307 that the device 101 is configured to respond to an SNMP-based multicast message multicast to a local network, the process proceeds to a step S308, wherein the controller 200 sets the multicast address to FF02::1. After that, the process proceeds to the step S311, wherein the controller 200 joins the multicast group using the SNMP daemon. That is, the controller 200 joins the SNMP-based multicast group defined by the multicast address generated in the step S308 using the SNMP daemon.

Packet Example 3 shown in FIG. 10 illustrates a packet sent back to the device management application when the device 101 listens to an SNMP-based multicast message after the present process proceeds through the step S307, the step S308 and the step S311.

If it is determined in the step S307 that the device 101 is not configured to respond to the SNMP message multicast to the local network, the process proceeds to a step S309, wherein the controller 200 checks settings of the operating section 204 (panel) of the device 101, and determines whether or not to send back a response to the neighbor solicitation. If it is determined in the step S309 that the device 101 is configured to send back a response to the neighbor solicitation, the process proceeds to a step S310, wherein the controller 200 joins a multicast address group using the ICMP daemon. As a consequence, the device 101 becomes one which is searched for (to which a response is sent back) in the second search process carried out by the device management application.

Packet Example 4 shown in FIG. 10 illustrates a packet sent back to the device management application when the device 101 listens to an ICMP-based multicast message after the present process proceeds through the step S309, the step S310 and the step S311.

In a step S312, the controller 200 awaits reception of a packet from the device management application. When the controller 200 receives the packet from the device management application, in a step S313, the controller 200 sends back a response to the device management application. Then, the process returns to the step S312, wherein the controller 200 awaits reception of a packet from the device management application again.

Here, as a method of obtaining the multicast address, a method will be described which generates the multicast address using a prefix, which is the IPv6 network address, in place of the hash value, and transmits the multicast address to a device.

Multicast address=$FF1X$+0+Prefix

Example: $FF1X$+0:0:0+$C$001:0000:0001:01$d$8=$FF$15: 0:0:0:$C$001:0000:0001:01$d$8

In this equation, X=5 represents a site local, and 1 of FF1X indicates that the site local is not well-known (i.e. is not assigned by the IANA). That is, the prefix, which is the IPv6 network address, is used for the multicast group in place of the hash value.

The device 101 listens to (receives) an SNMP-based multicast message using the above-mentioned multicast address. The device management application transmits a multicast packet to devices using the multicast address. It should be noted that the device 101 uses the prefix, which is the IPv6 network address, for the multicast group in place of the hash value, by the same method as employed in the device management application.

It is possible to select the hash function for use in calculating the above-mentioned multicast address from a plurality of hash functions on the respective sides of the device 101 and the side of the PC 102 (the device management application side). However, it is necessary that the hash functions used in the device 101 and the device management application are identical to each other.

Figure 11:
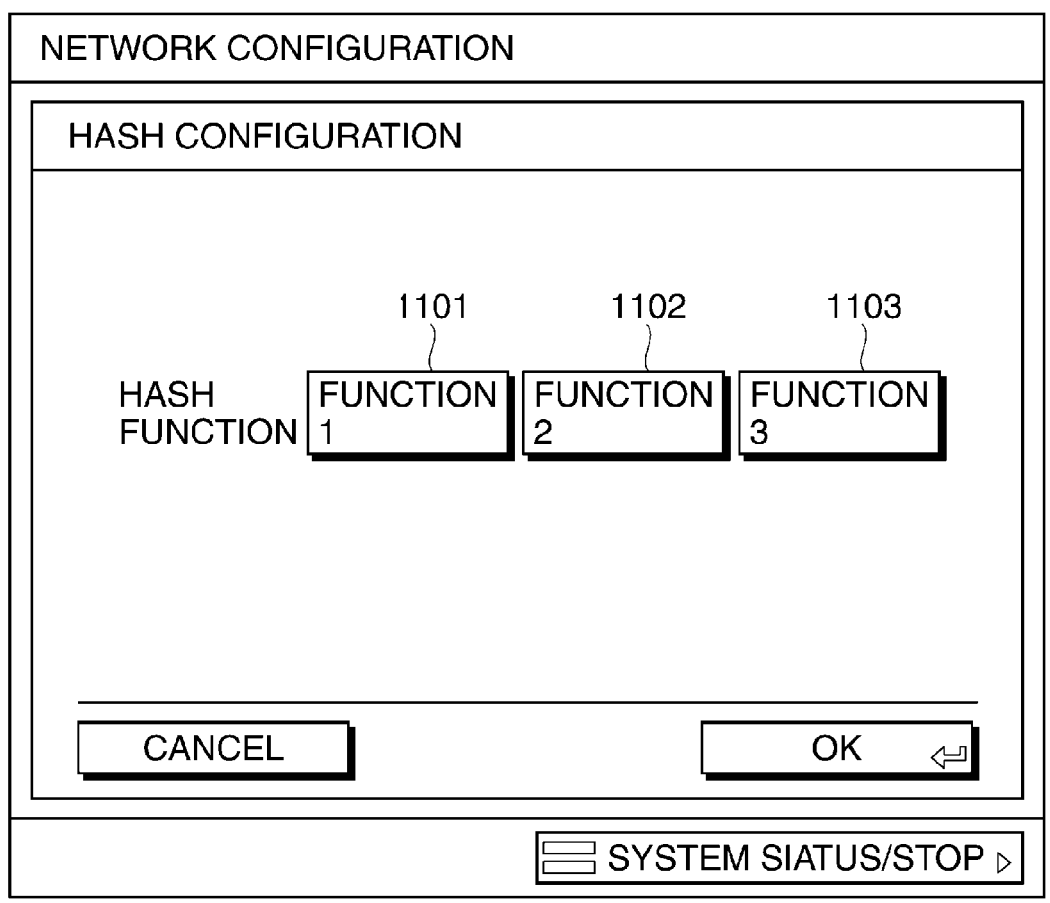
FIG. 11 is a view showing a hash function-selecting screen displayed on the operating section of the device.

FIG. 11 is a view showing a hash function-selecting screen displayed on the operating section 204 of the device 101. It is possible to select from as a plurality of hash functions: "FUNCTION 1" 1101, "FUNCTION 2" 1102, and "FUNCTION 3" 1103, on the FIG. 11 hash function-selecting screen.

FIG. 12 is a view showing a hash function-selecting screen of the device management application. It is possible to select from a plurality of hash functions: "FUNCTION 1" 1201, "FUNCTION 2" 1202, and "FUNCTION 3" 1203 on the FIG. 12 hash function-selecting screen.

Figure 13:
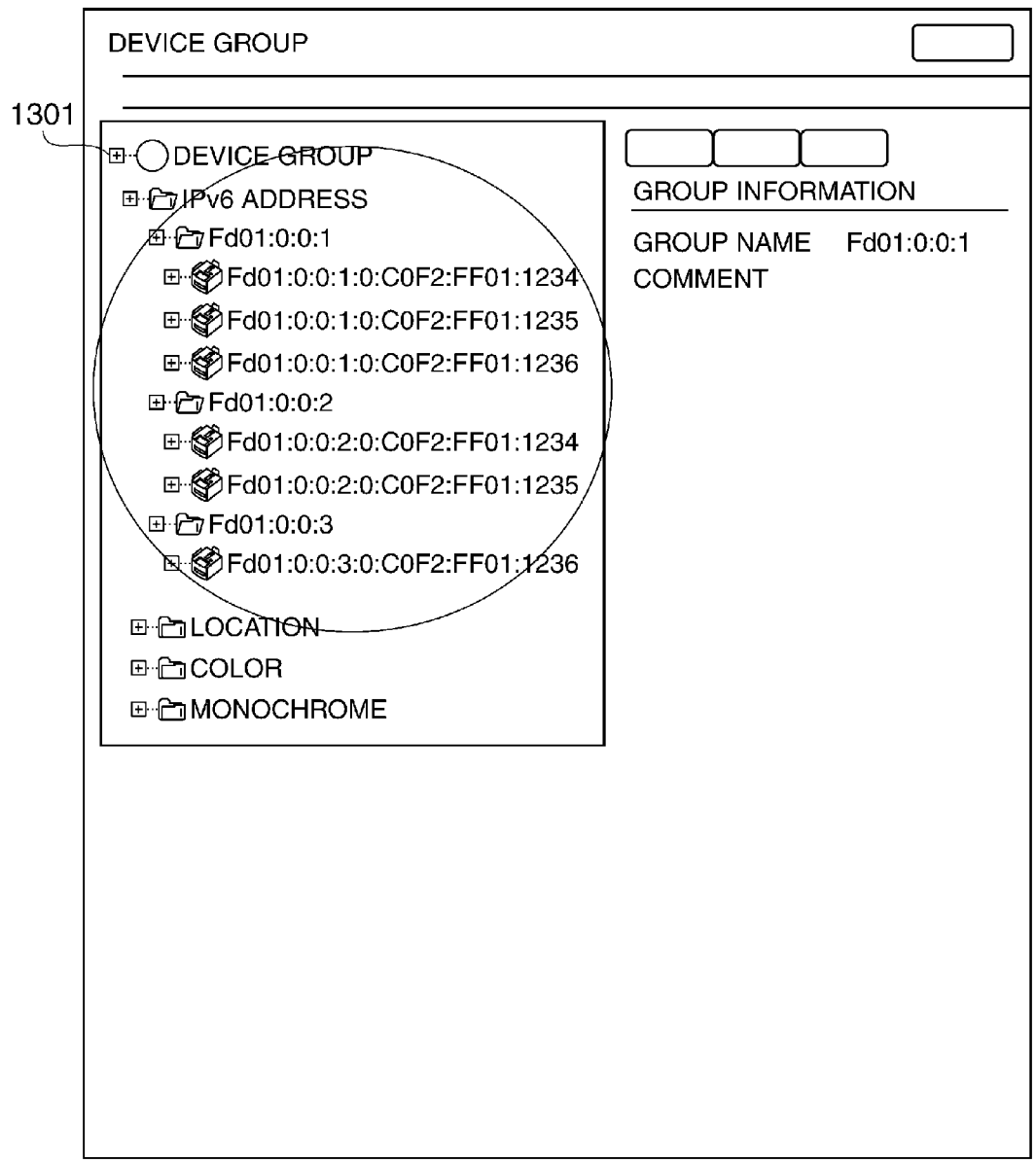
FIG. 13 is a view showing a device group screen of the device management application.

FIG. 13 is a view showing a device group screen of the device management application. The device group screen displays a device group 1301 which is information obtained by grouping devices according to each prefix as an IPv6 network address designated on the FIG. 7 IPv6 device search configuration screen.

FIG. 14 is a view showing the filter function of a device list screen of the device management application. One of the filter functions is one for filtering according to a prefix of the IPv6 address. A prefix as an IPv6 network address designated on the FIG. 7 IPv6 device search configuration screen is added to the device list screen as a default selection item and is displayed thereon.

As described heretofore, according to the present embodiment, in the network device management system, a multicast address generated from the prefix of an IPv6 network address is used by both a server and devices. This makes it possible to search for IPv6-compatible devices having the IPv6 network address which is designated from the device management application of the server.

Further, by using an ICMP packet for searching for devices, it is possible to search for standard devices belonging to a local network. Further, in an SNMP protocol-based device search using IPv6, it is possible to achieve a search for devices belonging to a local network or a designated network.

A second embodiment of the present invention is distinguished from the aforementioned first embodiment in points described hereinafter. The other component elements in the present embodiment are identical to the corresponding ones in the first embodiment (see FIGS. 1 to 5), and description thereof is omitted while denoting the component elements by the same reference numerals.

Figure 15:
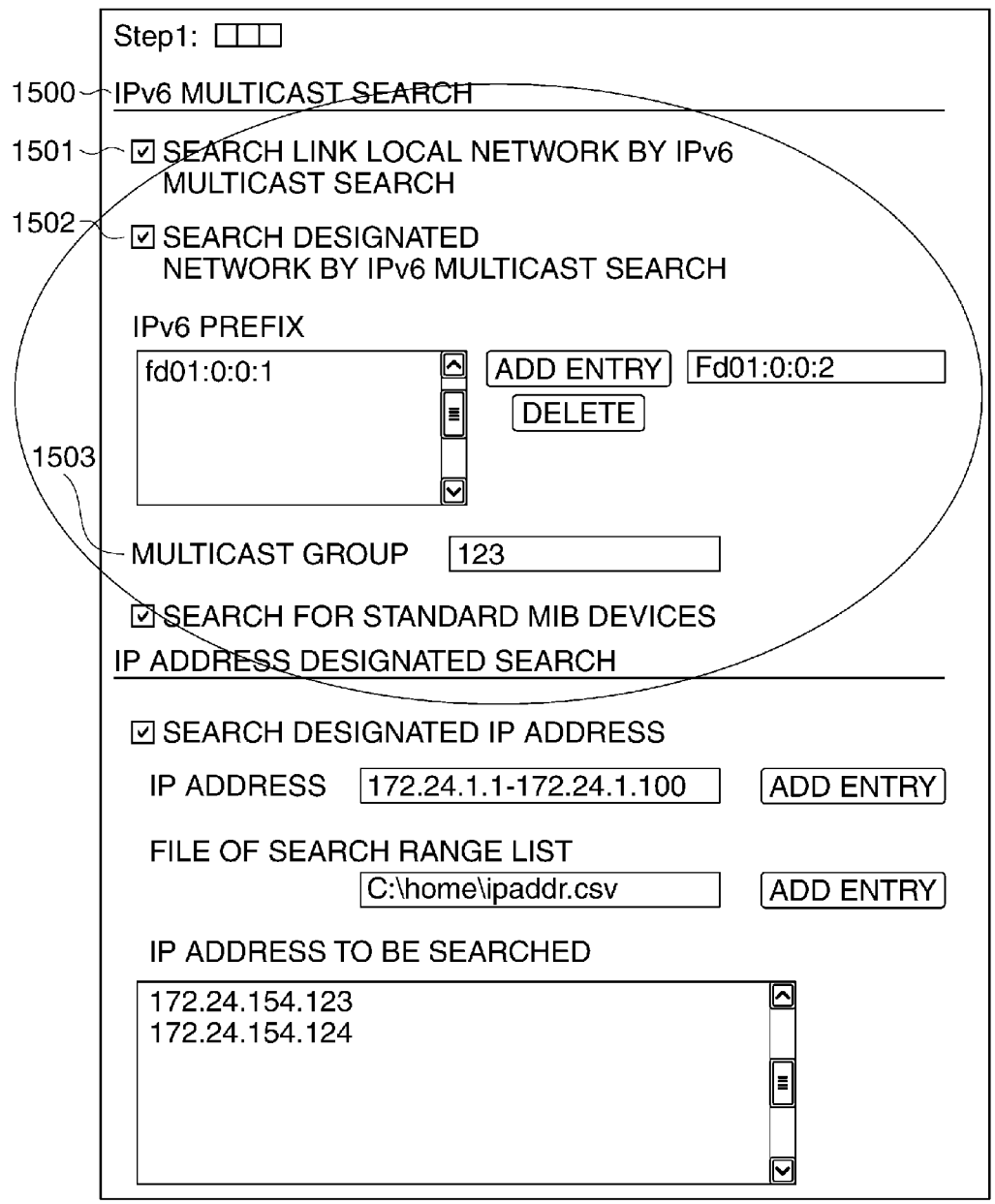
FIG. 15 is a view showing an example of a screen (IPv6 device search configuration screen) of a device management application for a network device management system as a network system including an information processing apparatus according to a second embodiment of the present invention.

FIG. 15 is a view showing an example of display (IPv6 device search configuration screen) of a device management application for a network device management system as a network system including an information processing apparatus according to the present embodiment.

From the FIG. 15 screen, "SEARCH LINK LOCAL NETWORK BY IPv6 MULTICAST SEARCH" 1501 and "SEARCH DESIGNATED NETWORK BY IPv6 MULTICAST SEARCH" 1502 can be selected for IPv6 multicast search 1500 as desired. The device search configuration screen is configured such that a multicast group 1503 can be designated. In the illustrated example, "123" is used to represent the multicast group.

A multicast packet transmitted from the device management application is generated by the following equation:

Multicast address=$FF1X$+Base address+Designated multicast group

Example: $FF1X+::1:0000+123(0\times7B)=FF15:0:0:0:0:0:1:007B$

Figure 16:
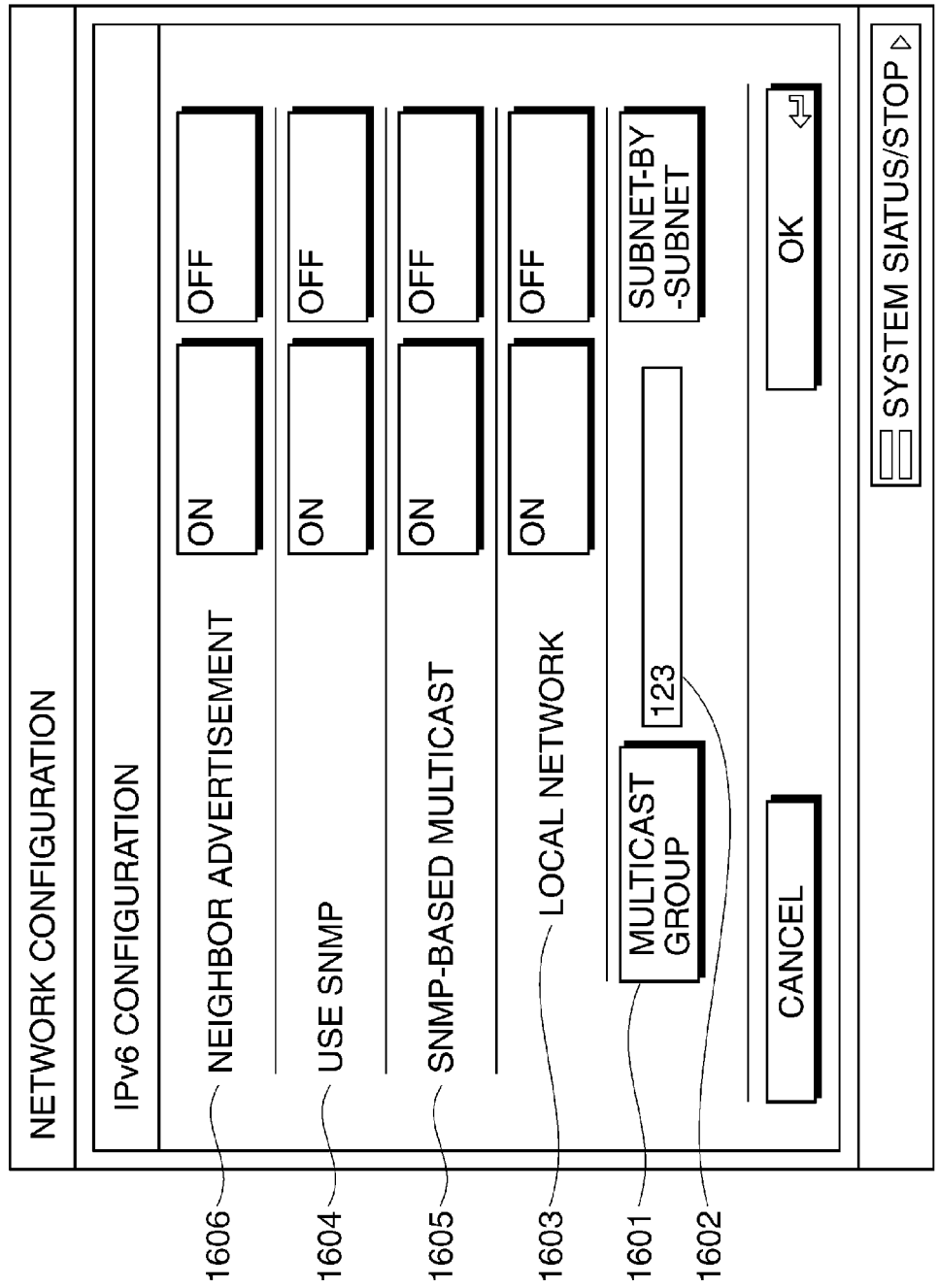
FIG. 16 is a view showing an example of a screen (IPv6 device search configuration screen) displayed on the operating section of the device.

FIG. 16 is a view showing an example of a screen (IPv6 device search configuration screen) displayed on the operating section 204 of the device 101.

Referring to FIG. 16, on the IPv6 device search configuration screen, a "MULTICAST GROUP" 1601 is selected (designated), and similarly to the device management application screen, "123" is set as a "MULTICAST GROUP VALUE" 1602. If a "LOCAL NETWORK" 1603 is set to ON, the SNMP daemon of the device 101 performs registration in a multicast address group of FF0X::1, and sends back a response to a request from the FF0X::1.

In the present embodiment, the SNMP protocol is used for a device search, and hence it is necessary to set both "USE SNMP" 1604 and "SNMP-BASED MULTICAST" 1605 to ON. In the illustrated example, an "NEIGHBOR ADVERTISEMENT" 1606 is set to OFF since it is not related to the characteristic points of the present embodiment.

Depending on the settings configured from the IPv6 device search configuration screen in FIG. 15 and the IPv6 device search configuration screen in FIG. 16, all the devices on the network each sent back a response to the multicast message transmitted by the device management application.

Figure 17:
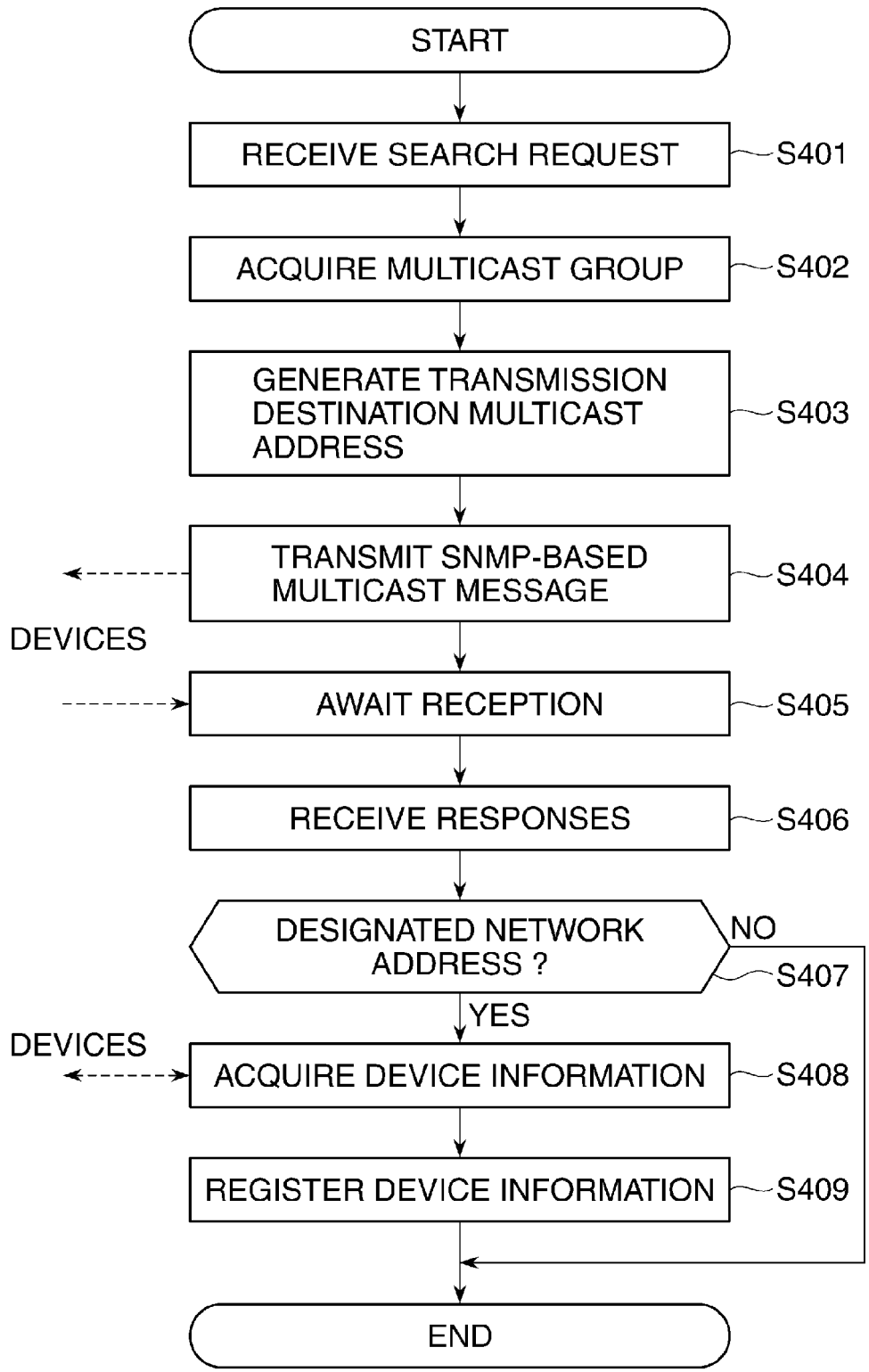
FIG. 17 is a flowchart of a search process executed when a device search is performed by the device management application.

FIG. 17 is a flowchart of a search process executed when a device search is performed by the device management application.

As shown in FIG. 17, in a step S401, the device management application of the server 100 receives a search request. In a step S402, the device management application acquires a multicast group from search conditions requested by the received search request. In a step S403, the device management application generates a multicast address for transmission. The equation used for calculating the multicast address is the same as described hereinabove in the first embodiment, and description thereof is omitted.

In a step S404, the device management application transmits an SNMP-based multicast packet. In a step S405, the device management application awaits reception of responses from devices. In a step S406, the device management application receives the responses from the devices. In a step S407, the device management application determines whether or not the responses received from the devices contain a designated prefix included in the search request received in the step S401.

If the responses received from the devices do not contain the designated prefix, the device management application discards information (device information) received from the devices, followed by terminating the present process. If the responses received from the devices contain the designated prefix, the process proceeds to a step S408, wherein the device management application additionally acquires device information from the devices. After additionally acquiring the device information, in a step S409, the device management application registers the device information in the database, followed by terminating the present process. The process in the step S407 makes it possible to search for only devices on the designated network.

FIG. 18 is a flowchart showing operations of the device 101.

As shown in FIG. 18, in a step S501, the controller 200 of the device 101 starts the device 101 along with the turn-on of the power of the device 101 by the user. In a step S502, the controller 200 acquires a multicast group set by the user via the operating section 204 (panel). In a step S503, the controller 200 generates a multicast address similarly to the above-described first embodiment.

In a step S504, the controller 200 participates in the multicast group using the SNMP daemon. That is, the controller 200 participates in the SNMP-based multicast group using the multicast address generated in the step S503. In a step S505, the controller 200 awaits reception of a multicast packet from the device management application. In a step S506, the controller 200 receives the multicast packet transmitted from the device management application, and sends back a response to the device management application. Then, the process returns to the step S505, wherein the controller 200 awaits reception of a multicast packet from the device management application.

As described hereinabove, according to the present embodiment, similarly to the aforementioned first embodiment, it is possible to search for IPv6-compatible devices having an IPv6 network address. Further, it is possible to search for standard devices belonging to a local network.

Although in the first and second embodiments, the description has been given of the configuration in which the device management application is caused to run on the server 100 and the browser is caused to run on the PC 102, by way of example, this is not limitative, but the device management application and the browser may be caused to run on the same device.

It is to be understood that the present invention may also be accomplished by supplying a system or an apparatus with a computer-readable storage medium in which a program code of software, which realizes the functions of either of the above described embodiments, is stored, and causing a computer (or CPU or MPU) of the system or apparatus to read out and execute the program code stored in the computer-readable storage medium.

In this case, the program code itself read from the computer-readable storage medium realizes the functions of either of the above described embodiments, and therefore the program code and the computer-readable storage medium in which the program code is stored constitute the present invention.

Examples of the computer-readable storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the computer-readable storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-164699 filed Jun. 24, 2008, which is hereby incorporated by reference herein in its entirety.

What is claimed is:

1. An information processing apparatus that is capable of communicating, using IPv6, with a plurality of image processing apparatuses connected to a network, comprising:
    a determination unit configured to determine whether or not search conditions for searching for image processing apparatuses are conditions for searching, by multicast, for image processing apparatuses belonging to a designated network;
    a specifying unit configured to specify information associated with the designated network, when said determination unit determines that the search conditions are conditions for searching, by multicast, for image processing apparatuses belonging to the designated network;
    a generation unit configured to generate a IPv6 multicast address using the information specified by said specifying unit;
    a transmission unit configured to transmit a search message designating the IPv6 multicast address generated by said generation unit; and
    a reception unit configured to receive a response transmitted from an image processing apparatus associated with the IPv6 multicast address.

2. The information processing apparatus according to claim 1, wherein when said determination unit determines that the search conditions are conditions for searching for image processing apparatuses belonging to a network to which the information processing apparatus belongs, said transmission unit transmits a neighbor solicitation for requesting the image processing apparatuses belonging to the network to respond thereto, and
    wherein said reception unit receives a neighbor advertisement sent back from an image processing apparatus that has responded to the neighbor solicitation.

3. The information processing apparatus according to claim 1, wherein said specifying unit calculates a hash value using a hash function based on the information associated with the designated network, and
    wherein said generation unit generates the IPv6 multicast address using the hash value calculated by said specifying unit.

4. The information processing apparatus according to claim 3, wherein the image processing apparatus that transmits the response is an image processing apparatus that belongs to the designated network and has the IPv6 multicast address generated using a hash value calculated by a same hash function as the hash function.

5. The information processing apparatus according to claim 3, comprising a selection unit configured to select the hash function for use in calculating the hash value from a plurality of hash functions.

6. The information processing apparatus according to claim 1, comprising an acquisition unit configured to acquire apparatus information of the image processing apparatus from the responses received by said reception unit, and
    the information processing apparatus discarding the apparatus information when the image processing apparatus the apparatus information of which has been acquired by said acquisition unit does not have the information associated with the designated network.

7. The information processing apparatus according to claim 6, comprising a display control unit configured to display the apparatus information acquired by said acquisition unit on a screen, and
    wherein said display control unit displays a prefix which is an IPv6 network address, on the screen, as one of filter functions of the screen.

8. The information processing apparatus according to claim 7, wherein said display control unit displays information obtained by grouping the image processing apparatuses according to each prefix as the IPv6 network address.

9. An image processing apparatus that is capable of communicating, using IPv6, with an information processing apparatus connected to a network, comprising:
    a reception unit configured to receive a search message designating a multicast address generated using a predetermined value which is calculated based on information associated with the network to which the image processing apparatus belongs;

a generation unit configured to generate a multicast address using a value calculated with a same algorithm as an algorithm used in the calculation by the information processing apparatus; and a participation unit configured to cause the image processing apparatus to participate in a multicast group using the multicast address generated by said generation unit, wherein said generation unit calculates a hash value with a same algorithm as an algorithm used in the calculation by the information processing apparatus, and generates a multicast address using the hash value.

10. A method of controlling an information processing apparatus that is capable of communicating, using IPv6, with a plurality of image processing apparatuses connected to a network, comprising:

determining whether or not search conditions for searching for image processing apparatuses are conditions for searching, by multicast, for image processing apparatuses belonging to a designated network;

specifying information associated with the designated network, when said determining determines that the search conditions are conditions for searching, by multicast, for image processing apparatuses belonging to the designated network;

generating a IPv6 multicast address using the information specified by said specifying;

transmitting a search message designating the IPv6 multicast address generated by said generating; and receive a response transmitted from an image processing apparatus associated with the IPv6 multicast address.

11. A non-transitory computer-readable storage medium storing a computer-executable program for causing a computer to execute a method of controlling an information processing apparatus that is capable of communicating, using IPv6, with a plurality of image processing apparatuses connected to a network, wherein the method comprises:

determining whether or not search conditions for searching for image processing apparatuses are conditions for searching, by multicast, for image processing apparatuses belonging to a designated network;

specifying information associated with the designated network, when said determining determines that the search conditions are conditions for searching, by multicast, for image processing apparatuses belonging to the designated network;

generating a IPv6 multicast address using the information specified by said specifying;

transmitting a search message designating the IPv6 multicast address generated by said generating; and receive a response transmitted from an image processing apparatus associated with the IPv6 multicast address.

* * * * *